United States Patent
Qin et al.

(10) Patent No.: US 11,658,734 B2
(45) Date of Patent: *May 23, 2023

(54) CHANNEL BONDING IN AN ADAPTIVE CODING AND MODULATION MODE

(71) Applicant: Hughes Network Systems, LLC, Germantown, MD (US)

(72) Inventors: Liming Qin, Gaithersburg, MD (US); Bala Subramaniam, Germantown, MD (US); Sri Bhat, Boyds, MD (US); Brandon Lasher, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,870

(22) Filed: Apr. 15, 2022

(65) Prior Publication Data

US 2022/0311507 A1    Sep. 29, 2022

Related U.S. Application Data

(63) Continuation of application No. 16/553,490, filed on Aug. 28, 2019, now Pat. No. 11,316,585, which is a
(Continued)

(51) Int. Cl.
*H04B 7/185* (2006.01)
*H04H 20/33* (2008.01)
(Continued)

(52) U.S. Cl.
CPC ......... *H04B 7/18526* (2013.01); *H04H 20/33* (2013.01); *H04H 20/423* (2013.01);
(Continued)

(58) Field of Classification Search
CPC .. H04B 7/18526; H04H 20/33; H04H 20/423; H04H 20/74; H04L 1/0003;
(Continued)

(56) References Cited

U.S. PATENT DOCUMENTS 7,869,759 B2   1/2011  Pateros et al.
8,037,541 B2  10/2011  Montague et al.
(Continued)

FOREIGN PATENT DOCUMENTS

WO   WO 2015/033265   3/2015

OTHER PUBLICATIONS

"DVB-S2X—S2 Extensions; Second Generation Satellite Extensions," DVB Project Office, Aug. 2016, 2 pages.
(Continued)

*Primary Examiner* — Luat Phung
(74) *Attorney, Agent, or Firm* — Fish & Richardson P.C.

(57) ABSTRACT

Methods, systems, and apparatus, including computer programs encoded on a computer storage medium, for channel bonding in an adaptive coding and modulation mode. In some implementations, a system receives packets of a data stream for transmission in a satellite communications system. The system determines a modulation and coding arrangement for the received packets. The system generates code blocks that include data from the packets of the data stream. The system assigns the generated code blocks for transmission on different carriers. One or more of the different carriers is operated in an adaptive coding and modulation mode to support multiple modulation and coding arrangements within a single carrier. The system transmits the code blocks on the different carriers using the determined one or more modulation and coding arrangements.

20 Claims, 7 Drawing Sheets

US 11,658,734 B2

Page 2

Related U.S. Application Data continuation of application No. 15/469,151, filed on Mar. 24, 2017, now Pat. No. 10,419,107.

(51) Int. Cl.

| | |
|---|---|
| *H04H 20/42* | (2008.01) |
| *H04H 20/74* | (2008.01) |
| *H04L 1/00* | (2006.01) |
| *H04L 1/06* | (2006.01) |
| *H04L 12/863* | (2013.01) |
| *H04W 28/08* | (2009.01) |
| *H04L 47/6295* | (2022.01) |
| *H04W 72/0453* | (2023.01) |

(52) U.S. Cl.
CPC ........... *H04H 20/74* (2013.01); *H04L 1/0003* (2013.01); *H04L 1/0009* (2013.01); *H04L 1/0643* (2013.01); *H04L 47/6295* (2013.01); *H04W 28/085* (2013.01); *H04W 72/0453* (2013.01)

(58) Field of Classification Search
CPC . H04L 1/0009; H04L 1/0643; H04L 47/6295; H04W 28/085; H04W 72/0453
See application file for complete search history.

(56) References Cited

U.S. PATENT DOCUMENTS

| | | | | |
|---|---|---|---|---|
| 8,516,333 | B1* | 8/2013 | Dave | H03M 13/1137 |
| | | | | 714/755 |
| 8,595,818 | B2 | 11/2013 | Karlin et al. | |
| 9,148,251 | B2 | 9/2015 | Ko et al. | |
| 9,438,374 | B2 | 9/2016 | Mitchell et al. | |
| 9,787,373 | B1* | 10/2017 | Kohli | H04B 1/1036 |
| 11,316,585 | B2 | 4/2022 | Qin et al. | |
| 2004/0085976 | A1 | 5/2004 | Dale et al. | |
| 2006/0039613 | A1* | 2/2006 | Withers | H04N 19/647 |
| | | | | 375/E7.072 |
| 2006/0039614 | A1* | 2/2006 | Withers | H04N 19/91 |
| | | | | 382/232 |
| 2008/0285675 | A1* | 11/2008 | Roberts | H04B 7/0632 |
| | | | | 375/267 |
| 2009/0175210 | A1* | 7/2009 | Vijayan | H04L 1/0065 |
| | | | | 370/312 |
| 2009/0199066 | A1* | 8/2009 | Kim | H04L 1/0083 |
| | | | | 714/752 |
| 2010/0046542 | A1 | 2/2010 | van Zelst et al. | |
| 2010/0054353 | A1* | 3/2010 | Roh | H04L 1/0656 |
| | | | | 375/260 |
| 2010/0103950 | A1* | 4/2010 | Statelov | H04N 21/23655 |
| | | | | 370/468 |
| 2011/0080972 | A1* | 4/2011 | Xi | H04L 1/0625 |
| | | | | 375/267 |
| 2012/0198502 | A1 | 8/2012 | Qin et al. | |
| 2014/0269627 | A1 | 9/2014 | Gorokhov et al. | |
| 2015/0156141 | A1 | 6/2015 | Michael et al. | |
| 2016/0072691 | A1* | 3/2016 | Xu | H04B 7/18578 |
| | | | | 370/252 |
| 2016/0212505 | A1* | 7/2016 | Morello | H04L 65/61 |
| 2016/0241320 | A1* | 8/2016 | Roberts | H04B 7/0413 |
| 2016/0365952 | A1 | 12/2016 | Kim et al. | |
| 2017/0223728 | A1* | 8/2017 | Luo | H04L 5/0053 |
| 2017/0238216 | A1* | 8/2017 | Damnjanovic | H04W 16/28 |
| | | | | 455/427 |
| 2018/0132013 | A1* | 5/2018 | Morello | H04L 5/0044 |

OTHER PUBLICATIONS

"Migration from DVB-S to DVB-S2 and Related Efficiencies," Comtech EF Date Corporation, May 2009, 6 pages.
DVB Organization, "TM-S0358_S2X-IGs-revision.docx", DVB, Digital Video Broadcasting, C/O EBU—17A Ancienne Route—CH-1218 Grand Saconnex, Dec. 2014, chapters 5, 6.
DVB Organization, "Implementation Guidelines for the Second Generation System for Broadcasting, Interactive Services, News Gathering and Other Broadband Satellite Application; Part 1 (DBV-S2)," DVB Document A171-1, Mar. 2015, 115 pages.
ETSI EN 302 307-1 v1.4.1, "Digital Video Broadcasting (DVB); Second generation framing structure, channel coding and modulation systems for Broadcasting, Interactive Services, News Gathering and other broadband satellite applications; Part 1: DVB-S2," Nov. 2014, 80 pages.
Gardikis et al., "Satellite Media Broadcasting with Adaptive Coding and Modulation," International Journal of Digital Multimedia Broadcasting, Jul. 2009, 2009(879290), 11 pages.
International Preliminary Report on Patentability in International Appln. PCT/US2018/023341, dated Sep. 24, 2019, 10 pages.
International Search Report and Written Opinion in Application No. PCT/US2018/023341, dated Jun. 28, 2018, 16 pages.
Internet-access-guide.com [online]. "Channel Bonding (CB)—When One Channel Is Not Enough," Oct. 2016, retrieved on Feb. 10, 2017, retrieved from URL<http://internet-access-guide.com/channel-bonding-cb-when-one-channel-is-not-enough/>, 1 page.
Morello, "DVB-S2: What Future for IP Services by Satellite?," DVB-S2, EN 302 307, Proceedings of NMC Seminar, Jun. 2006, 33 pages.
nhk.org.jp [online], "A6; Retransmission Technology for Super Hi-Vision Satellite Broadcasting for Cable TV Networks; Super Hi-Vision retransmission experiments using commercial cable networks," Apr. 2016, retrieved on Mar. 28, 2017, retrieved from URL<http://www.nhk.or.jp/strl/open2016/pdf/en/A6e.pdf>, 1 page.
PRnewswire.com [online] "Broadcom Delivers Multi-Channel DVB-S2X Satellite Set-Top Box Chip; Adds Support for Next-Generation Satellite Extensions with Full Band Capture and Eight Demodulators in a Single Chip," Jun. 2015, retrieved on Feb. 10, 2017, retrieved from URL<http://www.prnewswire.com/news-releases/broadcom-delivers-multi-channel-dvb-s2x-satellite-set-top-box-chip-300093528.html>, 1 page.
SatcomResources.com [online], "Adaptive Coding And Modulation (ACM)," Sep. 2013, retrieved on Feb. 10, 2017, retrieved from URL<http://www.satcomresources.com/acm-adaptive-coding-and-modulation>, 1 page.
Stanbury, "Satcom Direct offer Sky Stream™ bonding and aggregation service for faster airborne data transfer rates," Satcom Direct, May 2015, 1 page.
Stanbury, "Satcom Direct offers SwiftBroadband bonding and aggregation service with Cobham Satcom terminals for faster airborne data transfer rates," Satcom Direct, Apr. 2015, 2 pages.
uhp.net [online], "SCPC; High-Throughput Satellite Modem," available on or before Mar. 28, 2017, retrieved on Mar. 28, 2017, retrieved from URL<http://uhp.net/images/data/gallery/UHP-SCPC.pdf>, 1 page.
Viprinet.com [online] "Bonding instead of load balancing: Never be offline again!," Apr. 2016, retrieved on Feb. 10, 2017, retrieved from URL<http://web.archive.org/web/20150501000000*/https://www.viprinet.com/en/why-viprinet/how-viprinet-works>, 1 page.
viprinet.com [online], "Briefing on Adaptive Coding and Modulation (ACM)," Sep. 2010, retrieved on Mar. 28, 2017, retrieved from URL <https://www.viprinet.com/en/why-viprinet/how-viprinet-works>, 5 pages.
Volpefirm.com [online], "DOCSIS 3.0 Tutorial—Downstream Channel Bonding," Jul. 2010, retrieved on Feb. 10, 2017, retrieved from URL<https://volpefirm.com/downstream-channel-bonding/>, 1 page.
Wikipedia.com [online], "Channel bonding," Dec. 2016, retrieved on Feb. 10, 2017, retrieved from URL<https://en.wikipedia.org/wiki/Channel_bonding>, 1 page.
Wikipedia.com [online], "Generic Stream Encapsulation," Dec. 2016, retrieved on Feb. 10, 2017, retrieved from URL<https://en.wikipedia.org/wiki/Generic_Stream_Encapsulation>, 1 page.
Wikipedia.com [online], "Protocol data unit," Feb. 2017, retrieved on Feb. 10, 2017, retrieved from URL<https://en.wikipedia.org/wiki/Protocol_data_unit>, 1 page.
Willems, "DVB-S2X Demystified," Newtec White Paper, Mar. 2014, 12 pages.

* cited by examiner

CHANNEL BONDING IN AN ADAPTIVE CODING AND MODULATION MODE

CROSS-REFERENCE TO RELATED APPLICATIONS

This application is a continuation of U.S. application Ser. No. 16/553,490, filed Aug. 28, 2019, which is a continuation of U.S. application Ser. No. 15/469,151, filed Mar. 24, 2017, now U.S. Pat. No. 10,419,107, the disclosure of which is incorporated by reference in its entirety.

BACKGROUND

In satellite communication, efficient use of frequency bandwidth is important, since bandwidth is an expensive resource. Unused bandwidth on a frequency channel is undesirable, especially if higher data rates or additional users could be supported with the bandwidth.

SUMMARY

In some implementations, a satellite communication system can perform bonding of frequency channels in an adaptive coding and modulation (ACM) mode. Channel bonding allows a single input data stream to be carried in parallel over two or more carriers. In general, channel bonding can be used to reduce unused capacity on channels and/or to increase statistical multiplexing over two or more carriers. As discussed below, channel bonding can be performed with carriers in ACM mode. These carriers can be at different symbol rates and can be at different frequencies in the same or different frequency bands. ACM is one of the most commonly used modes of operation in wideband satellite communications systems. As a result, the ability to perform channel bonding for carriers in ACM mode greatly expands the ability of a satellite communications system to efficiently use its allotted spectrum.

Prior systems that have performed channel bonding have generally required carriers to operate in a constant coding and modulation (CCM) mode. These systems have not been able to synchronize the arrival of data at user terminals across multiple carriers when ACM mode is used. In particular, in ACM mode, the symbol rate of a carrier may vary from time to time, and the symbol rates may be different for different carriers. Similarly, the coding and modulation technique used may also vary, which varies the number of effective user bits that are transmitted per symbol. Due to these variations, conventional systems have not been capable of effectively synchronizing user data across multiple carriers in ACM mode. The lack of synchronization can disrupt video delivery and other applications, since user data packets on different carriers may arrive at a receiver out of order or with varying delays. As a result, conventional systems have been unable to support channel bonding for carriers in ACM mode.

As discussed below, a satellite communications system can include a code rate organizer module that manages the transmission of a data stream across two, three, or more different carriers, where one or more of the carriers operates in an ACM mode. This results in situations where the different carriers are transmitting at different effective user bit rates, and the code rate organizer ensures that traffic is distributed among the carriers that allows receives to reconstruct the data stream. The code rate organizer encodes the sequence of data elements transmitted, e.g., in headers of data blocks, so receivers can adequately reconstruct the original data stream from data received over multiple channels. The code rate organizer can also assign the data stream to be transmitted in a manner that satisfies timing constraints when received at a receiver. A receiver has a limited capacity to buffer information. The code rate organizer can thus manage the division of data across channels so that a sequence of data split over multiple channels arrives before exceeding the buffer capacity of the receiver. Receivers then reconstruct the original data stream by combining data received over different channels and ordering it using the sequence information specified in the headers of data blocks.

In one general aspect, the techniques disclosed herein describe methods of channel bonding for satellite communication. According to some of the methods, packets of a data stream are received for transmission in a satellite communications system. One or more modulation and coding arrangements are determined for the received packets. Code blocks that include data from the packets of the data stream are generated. Each code block has a header that includes a sequence identifier indicating a position of the code block in a sequence of the code blocks. The code blocks are assigned for transmission on different carriers. One or more of the different carriers is operated in an adaptive coding and modulation mode to support multiple modulation and coding arrangements within a single carrier. The code blocks are transmitted in the satellite communications system on the different carriers according to the assignments and using the determined one or more modulation and coding arrangements.

In some implementations, receiving the data stream includes receiving packets of a digital video broadcasting data stream to be broadcast, and transmitting the assigned code blocks includes broadcasting the digital video broadcasting data stream to a plurality of recipients using the satellite communications system.

In some implementations, determining the one or more modulation and encoding arrangements includes sorting the received packets of the data stream into multiple queues that each correspond to a different modulation and coding arrangement.

In some implementations, each of the multiple queues has a different data transmission rate according to the different modulation and coding arrangements. The method can include determining the data transmission rate for each of the multiple queues. Assigning the code blocks for transmission on the different carriers includes assigning the generated code blocks to the different carriers based on the determined data transmission rates.

In some implementations, assigning the code blocks for transmission on the different carriers includes assigning the code blocks synchronizes transmission of the code blocks across the different carriers.

In some implementations, assigning the code blocks for transmission on the different carriers includes assigning the code blocks to satisfy a timing constraint between transmission of one of the code blocks in the sequence and transmission of a subsequent code block in the sequence.

In some implementations, assigning the code blocks for transmission on the different carriers includes assigning at least some of the code blocks to be transmitted over a first carrier of the different carriers while an adjacent code block in the sequence is concurrently transmitted over a second carrier of the different carriers.

In some implementations, assigning the code blocks for transmission on the different carriers includes assigning the code blocks, so that for a given code block, not more than a predetermined maximum amount of data from the data stream is transmitted.

In some implementations, generating the code block includes generating each code block from packets for which a same modulation and coding arrangement was determined.

In some implementations, each of the different carriers is operated in the adaptive coding and modulation mode. Assigning the code blocks for transmission on the different carriers includes specifying, for each of the different carriers, a transmission sequence for the code blocks assigned to the carrier. Transmitting the generated code blocks includes transmitting, on each of the different carriers, code blocks assigned to the carrier in the transmission sequence specified for the code blocks assigned to the carrier.

In some implementations, the data stream is a first data stream. The method also includes receiving one or more additional data streams; generating a sequence of code blocks for each of the one or more additional data streams, where the code blocks corresponding to each data stream include a stream identifier for the data stream; and interleaving transmission of the code blocks of the one or more additional data streams on the different carriers with transmissions of the code blocks for the first data stream.

In some implementations, generating the code blocks includes generating code blocks that each have a fixed data length and each include one or more generic stream encapsulation elements.

Other embodiments include corresponding systems, apparatus, and software programs, configured to perform the actions of the methods, encoded on computer storage devices. For example, some embodiments include a satellite terminal configured to perform the actions of the methods. A devices and systems of devices can be so configured by virtue of software, firmware, hardware, or a combination of them installed so that in operation cause the system to perform the actions. One or more software programs can be so configured by virtue having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
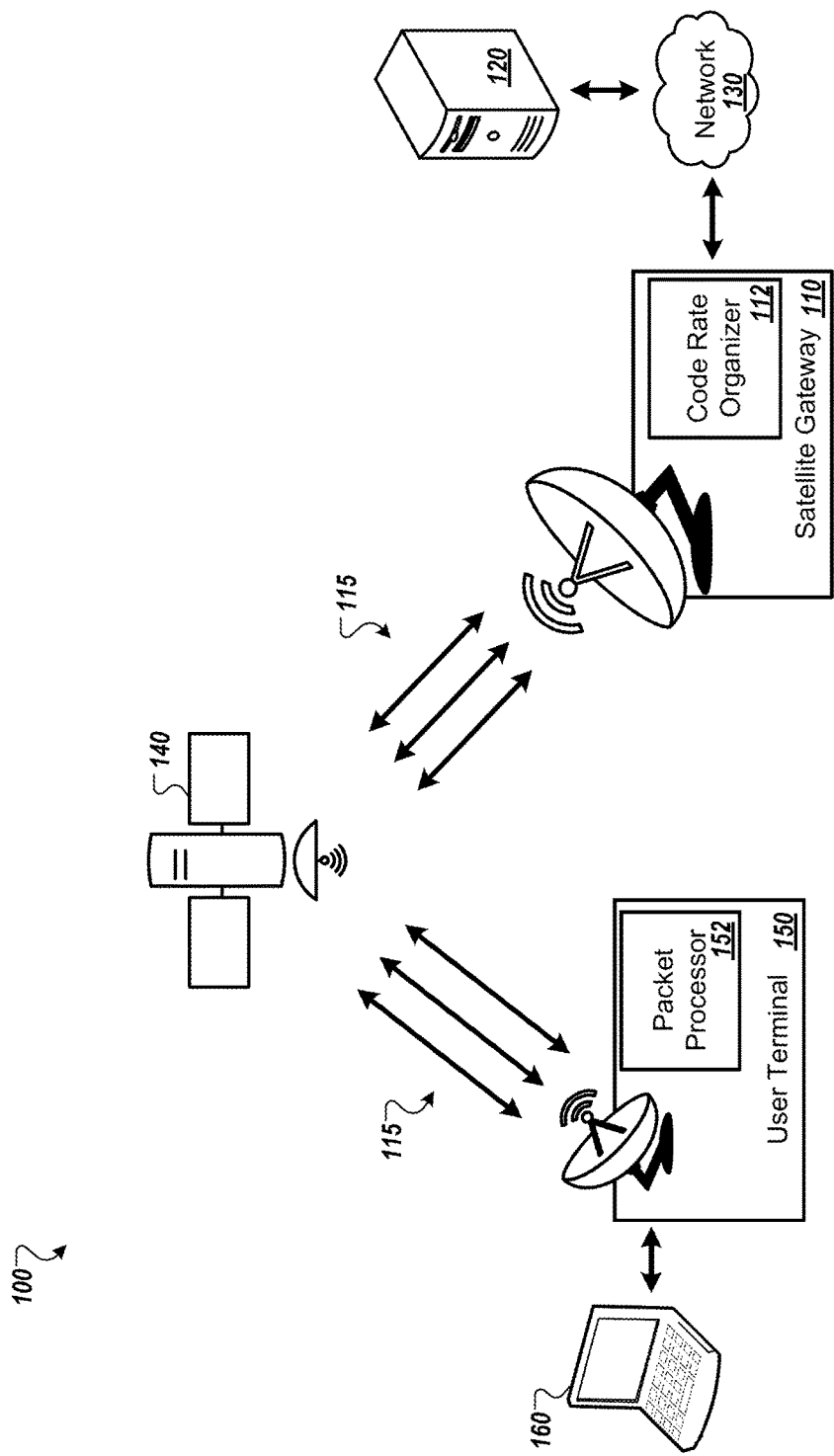
FIG. 1 is a diagram that illustrates an example of a system for channel bonding in an ACM mode.

FIG. 1 is a diagram that illustrates an example of a system 100 for channel bonding in an ACM mode. The system 100 includes a satellite gateway 110 that receives a data stream from a data source 120 over a network 130. The satellite gateway 110 includes code rate organizer (CRO) 112 that performs bonding of multiple frequency channels or carriers. For example, the CRO 112 packages packets from the data stream into code blocks, and assigns the code blocks to be transmitted concurrently on two or more frequency channels. Each of the frequency channels used for bonding can be operated in an ACM mode. This can provide a number of benefits, including the ability to dynamically adjust the tradeoff between robustness and data rates in response to changing weather or other conditions. By dividing code blocks among various channels, the satellite gateway 110 can increase the overall efficiency of spectrum usage of the system 100.

In the illustrated example, the satellite gateway 110 is shown using three different frequency channels 115 to transmit the data of a single data stream. Of course, more or fewer channels could be bonded to carry the data stream in parallel. The channels 115 may be in the same frequency band or different frequency bands. For example, channels 115 may be in the Ka-Band (e.g., approximately 26-40 GHz), Ku-Band (e.g., approximately 12-18 GHz), or C-Band (e.g., approximately 4-8 GHz). Channels in other bands may be used in addition or as an alternative.

In some implementations, the system 100 can be used for digital video broadcasting. As an example, the system may transmit video data generally according to DVB-S2 or ETSI EN 302 307-2 standards, with modifications to support channel bonding in ACM mode as discussed below.

Data transmitted by the satellite gateway 110 is relayed by a satellite network 140 to a receiver, such as user terminal 150. The user terminal 150 includes multiple tuners so it can concurrently receive and demodulate data from each of the channels 115 used to transmit the data stream. The user terminal 150 also includes a packet processor 152 that combines the data received over the multiple channels 115 and reconstructs the original data stream. The packet processor 152 uses information that the code rate organizer 112 inserted in headers to properly place the received data in the correct order.

Due to the manner in which the CRO 112 distributes traffic among the channels 115, the data is received within the timing constraints of the user terminal 150. The user terminal 150 may include a buffer for each channel 115, and the CRO 112 can distribute the data among the channels 115 so that received data can be placed in the reconstructed sequence before exceeding the capacity of any of the buffers. For example, a sequence of packets may be split so a first set of packets is sent over a first channel, and a second, subsequent set of packets in the sequence is sent over a second channel. The CRO 112 assigns the packets so that the number of second packets received does not exceed the buffer capacity before all of the earlier first packets have been received. Thus, the CRO 112 synchronizes the data transmissions among the different channels 115, even as the channels 115 use different modulation and coding schemes. In some instances, sets of user data packets that are adjacent in the data stream may be received at the same time, or in the order the data occurs in the data stream. For example, the CRO 112 may assign a first packet of a sequence to be transmitted over channel one while a second packet of the sequence is transmitted over channel two; a third packet of the sequence may be transmitted over channel one while a fourth packet of the sequence is transmitted over channel two; and so on. Additional techniques for coordinating the transmission and reception of a data stream can be used, as discussed further below.

Figure 2:
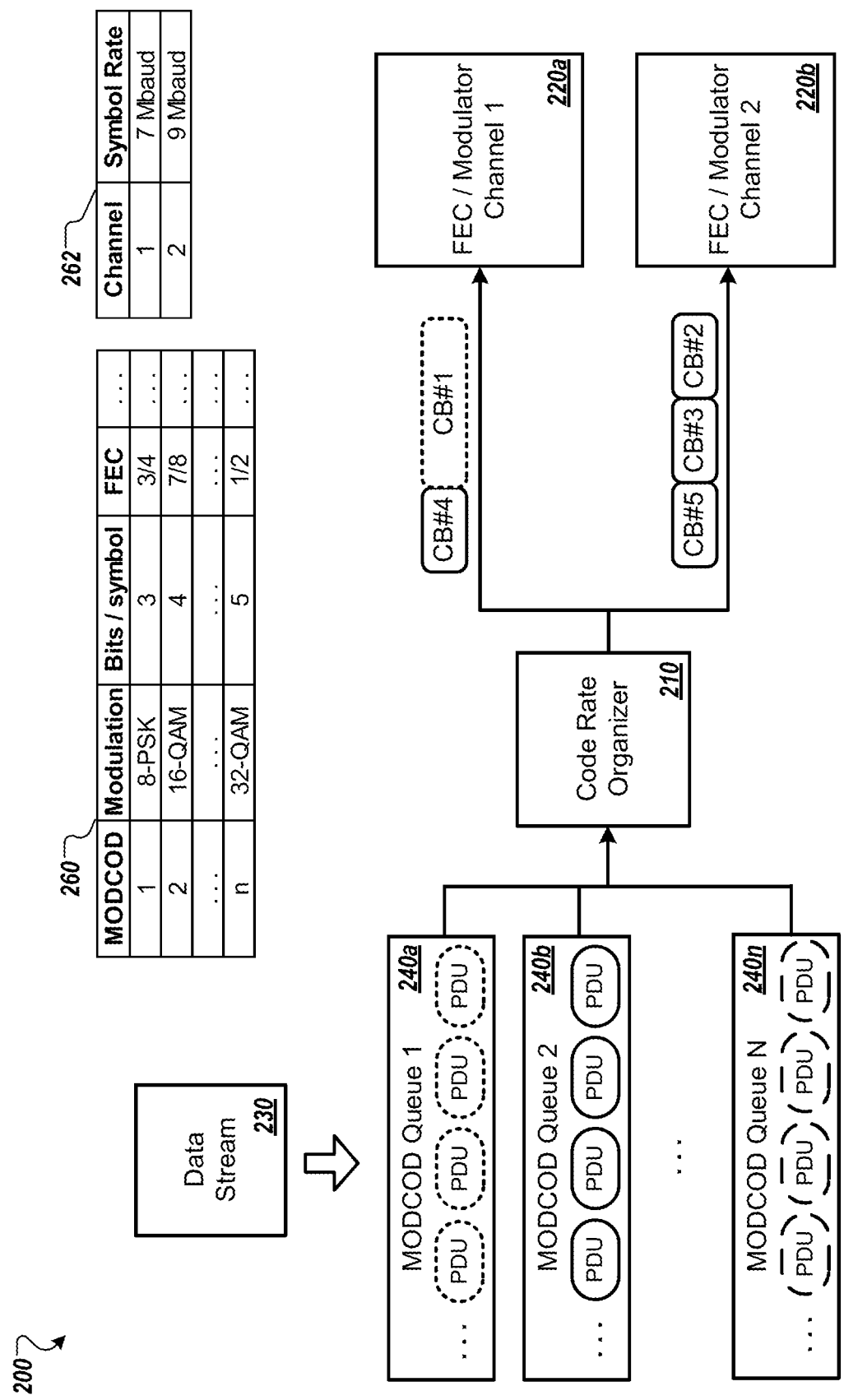
FIG. 2 is a block diagram that illustrates an example of channel bonding operations at a transmitter.

FIG. 2 is a block diagram that illustrates an example of channel bonding operations at a transmitter 200. Elements of the transmitter 200 illustrated include a code rate organizer (CRO) 210 and two forward error correction (FEC) and modulation and coding modules 220a, 220b. Briefly, the example of FIG. 2 shows the CRO 210 processing a data stream 230 and splitting transmission of the data stream 230 among two carriers or frequency channels that are operating in ACM mode. Additional carriers could optionally be bonded also, so that the data stream 230 can be split among three or more channels. The CRO 210 distributes code blocks that include data from the data stream 230 to the to FEC/modulation modules 220a, 220b to match the capacity of each carrier for transmission. For clarity, FIG. 2 illustrates operations for transmitting a single data stream 230. A discussion of concurrent transmission of multiple data streams is provided with respect to FIGS. 5 and 6.

The data stream 230 includes a series of packets or payload data units (PDU) of a single input stream to be transmitted. In some implementations, the data stream 230 may be a digital video broadcasting data stream. The PDUs in the data stream 230 generally occur in a specific sequence, and the transmitter is arranged to provide the receiver the needed information to correctly reconstruct that sequence.

The CRO 210 sorts the PDUs of the data stream 230 into modulation and coding (MODCOD) queues 240a-240n. Each MODCOD queue represents a different combination modulation and/or coding arrangement. Examples of different modulations include 16-APSK, 8-PSK, QPSK, 16-QAM, 64-QAM, and so on. The coding arrangement can indicate, for example, different forward error correction coding rates, which can be expressed as a fraction of data bits out of total bits transferred, e.g., ½, ⅔, ¾, ⅞, and so on. In the example, queue 240a includes of PDUs designated to be sent using the MODCOD "¾ 8-PSK", queue 240b includes PDUs designated to be sent using the MODCOD "⅞ 16-QAM", and queue 240n includes PDUs designated to be sent using MODCOD "½ 32-QAM." The number of MODCODs supported, and thus the number of queues 240a-240n, can vary as needed to provide appropriately address many combinations of modulations and codings.

In some implementations, each of the carriers used are operating in ACM mode, and so each carrier can support multiple different MODCOD arrangements. For example, each channel used for bonding may support each of the MODCOD arrangements. In other implementations, one or more of the channels used for bonding may be operated in CCM mode while one or more other channels used for bonding is operated in ACM mode. Similarly, in some instances, bonded channels may both operate in ACM mode, but may support different sets of MODCODs.

Before PDUs are processed by CRO 210, one or more processors of the transmitter 200 or another device may assign the PDUs to appropriate MODCOD queues. The PDUs to be transmitted are placed into MODCOD queues representing the types of modulation and coding that are appropriate for the user terminals that will receive the data. Because different user terminals experience different physical channel conditions, different MODCODs may be used to transmit data to different user terminals. In addition, the transmitter 200 can dynamically switch which MODCOD is used for a user terminal as physical channel conditions change.

For each user terminal, the MODCOD used (and thus the MODCOD queue selected) varies based on the physical channel conditions detected by the receiving user terminal. A user terminal can provide the transmitter 200 information about current channel conditions. With that information, the transmitter 200 can identify MODCODs that satisfy certain criteria, e.g., MODCODs that allow reception within an error rate threshold. For example, the transmitter determines which MODCODs allow transmissions to be received error free. The transmitter 200 then selects, from among the MODCODs that satisfy the error rate criteria, the MODCOD that provides the highest throughput. PDUs for transmission to the user terminal are placed in the MODCOD queue for the selected MODCOD.

The transmitter 200 can use any of various techniques to assign PDUs of the data stream 230 to the various MODCOD queues. In some instances, the PDUs from a single stream may all be placed in the same queue 240a-240n. The transmitter 200 may change the MODCOD and corresponding queue 240a-240n for the data stream 230, for example, to address factors that affect physical channel conditions such as weather. The transmitter 200 may receive information about satellite link conditions and transition a data stream 230 from one MODCOD to another. In some implementations, the transmitter 200 may divide a data stream 230 into multiple MODCOD queues 240a-240n in normal operation, for example, so one fraction of the data stream 230 is added to one queue 240a-240n and the rest of the data stream 230 is provided to other queues 240a-240n.

The CRO 210 extracts PDUs from the queues 240a-240n and uses them to generate code blocks that are later modulated and sent over the satellite link. When processing the data in the queues 240a-240n, the CRO 210 extracts the PDUs from a queue 240a-240n in the order the packets were added, e.g., the queues 240a-240n can be first-in-first-out (FIFO) queues. The CRO 210 then takes a sequence of PDUs and arranges the data into a code block, as discussed with respect to FIG. 3. When extracting data from the MODCOD queues, the CRO 210 may switch between different MODCOD queues in any sequence. Since each queue is a separate FIFO, the order of PDUs taken from a queue will be maintained, while the order of PDUs from different queues do not need any special care.

Figure 3:
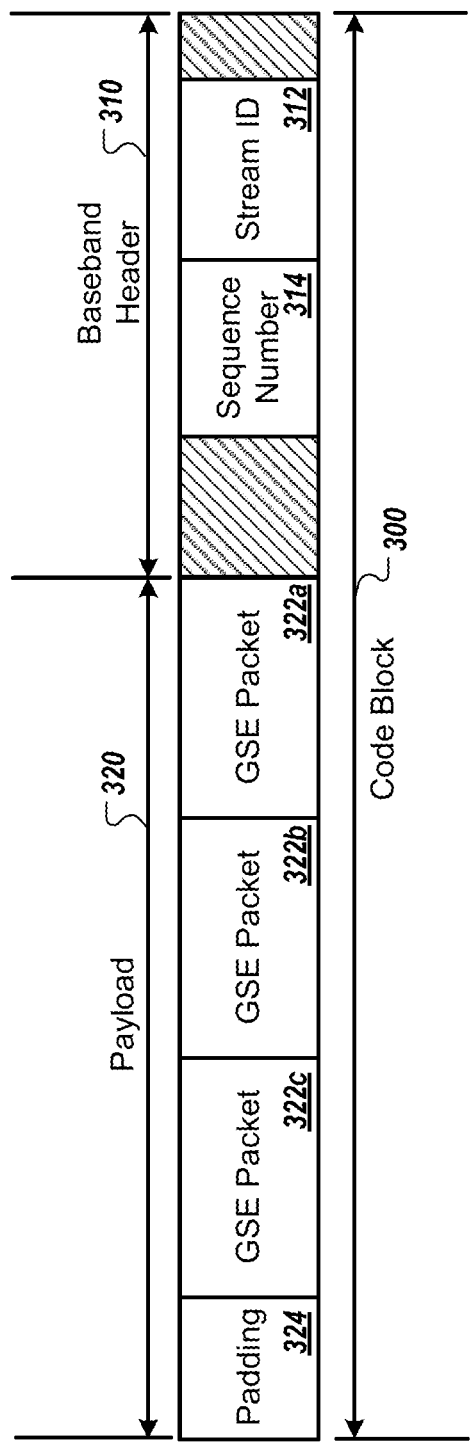
FIG. 3 is a diagram that illustrates an example of a code block format.

Referring to FIG. 3, an example of a format of a code block 300 is shown. The code block 300 includes a baseband header 310 and a payload 320. The baseband header 310 can include many fields, only two of which are illustrated. These are the fields for a stream ID 312 and a field for a sequence number 312. The payload 320 includes data from one or more PDUs. The data of multiple PDUs can be aggregated into a single code block 300. For example, a sequence of several PDUs can be extracted from a single MODCOD queue 240a. These extracted PDUs can then be included in elements of the payload 320. The PDUs are fragmented and encapsulated using a packet encapsulation protocol, such as generic stream encapsulation (GSE), to fill the payload section of the code block 300. These encapsulated PDUs are shown as GSE packets 322a-322c. The arrangement of the payload 320 can indicate the order that the underlying PDUs were sent in the data stream 320. For example, PDUs extracted from queue 240a in order first, second, and third, can be respectively encoded into the payload 320 as the first, second, and third GSE packets 322a-322c to preserve information about the sequence. Other techniques for maintaining sequence information of the PDU data is included in the code block 300 can be used, such as including information indicating the order in the baseband header 310.

Different PDUs may be aggregated in a single code block 300. In some implementations, each code block 300 that is generated includes only data from only a single MODCOD queue 240a-240n. Other implementations may allow data from queues 240a-240n for multiple MODCODs to be mixed in the same code block 300. For example, MODCODs may be ranked according to the signal-to-noise ratio (SNR) required for successful error-free reception and decoding by a receiver. MODCODs that have a lower minimum signal-to-noise requirement can be ranked lower. A code block can include PDUs from any of the MODCOD queues 240a-240n from the same or lower ranking. In other words, a code block 300 including PDUs designated for a MODCOD with a particular signal-to-noise requirement may also include PDUs for MODCODs with the same or less demanding signal-to-noise requirement.

In general, transmission of the code block 300 with a particular MODCOD is effective to apply those settings to the data designated for that MODCOD, or to data designated for a MODCOD that can tolerate an even lower signal-to-noise condition. In the example of FIG. 2, each code block 300 includes data from a single data stream, and data from different streams are not mixed in the same code block. Typically, data from different streams are not mixed in the set of MODCOD queues, e.g., each data stream can have its own corresponding set of MODCOD queues 240a-240n. The stream ID 312 is used to designate the data stream to which the code block 300 corresponds.

As discussed further below with respect to FIGS. 5 and 6, a transmitter can send data from multiple different data streams concurrently. When doing so, a separate set of MODCOD queues can be used for each data stream. Thus, the packets of different data streams are not aggregated at the code block level or within the same MODCOD queues.

Referring still to FIG. 2, the stream ID 312 can be an identifier for the data stream being transmitted, e.g., the data stream 230 of FIG. 2. This stream ID helps receivers differentiate traffic that is part of the data stream 230 from traffic of other streams that may be sent on the same carrier. Typically the stream ID 312 remains constant during broadcasting of a data stream 230. The sequence number 314 indicates the position that a code block 300 in the sequence of code blocks for a carrier. The code block sequence number 314 is used to identify the order that the code blocks 300 are created, which allows receivers to reconstruct the original order. As discussed further below with respect to FIGS. 5 and 6, when code blocks 300 are transmitted, code blocks 300 for different data streams may be placed onto different carriers and/or code blocks for a data stream may be spread across multiple carriers. The stream ID 312 and sequence number 314 allow a receiver to properly reconstruct each data stream in its correct order.

The sequence number 314 will be embedded into the baseband header of each code block 300 in the order that the code blocks are created by the CRO 210. Generally, the sequence number 314 is incremented for each code block 300 in the data stream 320. The sequence numbers of the code blocks reflect the sequence that the code blocks are created, and thus indicate the order of the code blocks of the data stream. For example, the CRO 210 may aggregate PDUs 1, 2, and 3 of MODCOD queue 240a into a first code block for data stream 230 with a sequence number of 1. The CRO may then aggregate PDUs 4, 5, and 6 of MODCOD queue 240a into a second code block for the data stream 230 that is given sequence number 2. The sequence number 314 can be an integer value. In some implementations, the sequence number 314 has at least 8 bits. When the end of the range of sequence numbers is reached, the values wrap around, e.g., from 255 to 0 for an 8-bit sequence number field.

The CRO 210 can label or track which MODCOD queue 240a-240n was used to generated code blocks 300, so the correct MODCOD arrangement corresponding to each code block 300 will be used. This information may optionally be included in the baseband header 310, or in information outside the code block 300, e.g., a memory of the transmitter 200.

In some implementations, the code block 300 has a fixed size or data length. The size of the GSE packets 322a-322c and number of GSE packets 322a-322c may vary so that not all of the space allotted for the payload 320 is used. In these instances, padding 324, such as zeros, to fill the remainder of the payload 320.

Referring again to FIG. 2, the CRO 210 generates code blocks from the PDUs in the MODCOD queues 240a-240n. The CRO 210 then distributes the code blocks in a manner that efficiently uses the available bandwidth of the carriers. The code blocks are also distributed with a sequence and synchronization that allows a receiver to properly reconstruct the data stream 230 spread across the different carriers. In the example of FIG. 2, code blocks CB #1 to CB #5 are shown. Code block CB #1 was generated from PDUs in MODCOD queue 240a. After generating code block CB #1, the CRO 210 switches to MODCOD queue 240b to generate code blocks CB #2 to CB #5. The code blocks CB #1 to CB #5 may represent data from a single data stream. For example, the transition from MODCOD 1 to MODCOD 2 could represent an improvement in satellite link conditions making a higher throughput encoding possible. Alternatively, the code block CB #1 may represent data from a different data stream, with the CRO 210 switching to the MODCOD queue 240b, for example, to fill available bandwidth or to provide a desired data rate for the data stream 230.

Since the code blocks CB #1 to CB #5 each have the same, fixed data length, each code block represents the same number of bits. However, due to the differences in the modulation and coding, the amount of time needed to transmit a code block varies from one MODCOD to another. Similarly, different carriers can use different symbol rates, and so the amount of time to transmit a code block on different carriers may vary, even when using the same MODCOD. The CRO 210 can compute the amount of time required for a code block to be transmitted over each of the different channels and with each of the different MODCODs. For example, the CRO 210 can store or otherwise obtain rate data 260 that indicates parameters such as a modulation type, number of bits per symbol, and FEC coding that correspond to each MODCOD. The CRO 210 can also obtain channel data 262 that indicates a symbol rate for each channel, and potentially other information about the channel. For example, the CRO 210 determines that the carrier for channel 1 is operated at a symbol rate of 7 Mbaud (e.g., million symbols per second), and that using MODCOD 1 allows transmission of three bits of a code block per symbol with an FEC ratio of ¾. Multiplying these values together, the CRO 210 can determine a data rate of 15.75 Mbit for transmissions on channel 1 using MODCOD 1. Similarly, the CRO 210 determines that the carrier for channel 2 is operated at a symbol rate of 9 Mbaud, and that using MODCOD 2 allows transmission of four bits of a code block per symbol with an FEC ratio of ⅞, which results in a data rate of 31.5 Mbit. The CRO 210 can determine the duration of time needed to transmit a code block from any of the MODCODs, on any of the carriers available. In the particular example, the duration of a code block transmission on carrier 1 using MODCOD 1 is twice the duration of a code block transmission on carrier 2 using MODCOD 2.

Since the MODCOD used to transmit a code block 300 affects the duration of a code block transmission, the CRO 210 can use this information to efficiently fill available bandwidth across channels. For example, the CRO 210 can determine the duration of time needed to transmit a code block for each of the MODCODs that are being used. Then, when bandwidth is available, even for a short duration, the CRO 210 can identify code blocks that would effectively fill the bandwidth with their assigned MODCODs. For example, although FIG. 2, shows code blocks 300 of a single data stream 230, the CRO 210 may obtain code blocks from other data streams (e.g., for transmission to other user terminals) and interleave those transmissions on the same channels. The code blocks of other data streams may be transmitted using MODCODs different from the ones used to transmit the code blocks 300 of the data stream 230. In this manner, the CRO 210 can increase bandwidth usage up to the available capacity.

Different channels may have different symbol rates and different carrier frequencies. Different channels may have different trajectory tables, e.g., different sets of MODCODs available or different tables of rate data 260. In some instances, if channels are bonded together, it may be preferable to share the same MODCOD for the same data stream across multiple channels. As a result, when traffic of a particular user terminal is bonded across multiple channels, traffic can be assigned for transmission using the same MODCOD on each of the multiple channels. The selection of which MODCODs to use for a given user's data is driven by user terminal's feedback per their locally measured SNR. This information from each user terminal is used to select which MODCOD queue(s) the data for the user terminal should be placed. As the SNR at a user terminal changes, the transmitter receives information regarding the change and can switch to a different MODCOD for that user, e.g., by assigning later data in the data stream to appropriate MODCOD queues.

In some implementations, receivers provide SNR information or information about interference for each of multiple channels. The satellite gateway 110 or other transmitter may use this information to select which channels should be used for bonded communication for each receiver, as well as which MODCOD should be used. The satellite gateway 110 may allocate traffic to a receiver in a number of different ways, including selecting channels that allow the highest throughput, and avoiding channels with interference or low SNR for which few or no MODCODs can provide acceptable reception.

When distributing code blocks CB #1 to CB #5 to the different carriers, the CRO 210 takes into account the expected requirements of the receiver for eventually reconstructing the original data stream 230. For example, receivers generally include a buffer to store data that arrives out of order for a data stream, but the buffer has a limited capacity. To avoid exceeding the buffer capacity of a receiver, the CRO 210 may assign the code blocks CB #1 to CB #5 to the different carriers in a manner that limits the delay of any code blocks CB #1 to CB #5 that arrive out of order. The CRO 210 may operate with a constraint on the amount of time that may pass or the amount of data of a stream that can be transmitted before filling a gap in a code block sequence.

The code blocks CB #2 and CB #3 are issued to the same channel, in sequential order, which does not cause any re-ordering problems. Similarly, the CRO 210 assigns CB #4 and CB #5 to arrive concurrently on different channels. When availability permits, the CRO 210 can attempt to carry out channel bonding by transmitting code blocks in this manner, with code blocks for a data stream that have adjacent sequence numbers being designated for transmission sequentially on a single channel or being transmitted simultaneously on different carriers.

Another aspect of the synchronization is the ability of the CRO 210 to assess the variations due to variable coding, and to satisfy timing constraints while code blocks of a single data stream are split among different MODCOD queues 240a-240n. For example, the code blocks CB #1 to CB #5 can represent of the same data stream 230, with CB #1 being transmitted at a different data rate than the others. Thus, rather than simply alternate code blocks between the two carriers, the CRO 210 determines the slower effective data rate of the transfer of code block CB #1, given the different modulation and encoding, and assigns two code blocks, CB #2 and CB #3, to be transferred on the other channel. For example, the CRO 210 may assign code blocks to the different channels proportionally to the actual data rates (e.g., PDU bits transfer rates) on different channels.

As noted above, symbol rates may vary from one channel to another. Padding, encapsulation, and code block headers can add additional data to be transmitted over a channel. The CRO 210 can determine how much overhead occurs and determine the amount of user bits, e.g., PDU bits, that would be transmitted by code blocks over different channels. For example, due to differences in symbol rates, one channel may provide a 25% greater throughput in user bits than another channel. To account for the difference, the CRO 210 may provide 5 code blocks 300 to the higher-symbol-rate channel for every four code blocks 300 provided to the lower-symbol-rate channel so that the two parts of the data stream 230 arrive in synchronization at the receiver. As another example, the CRO could provide code blocks 300 of the data stream 230 to the two channels at an equal rate, but intersperse code blocks of other data streams on the higher-symbol-rate channel to maintain synchronization of the data stream 230.

The CRO 210 provides the code blocks CB #1 to CB #5 to the FEC/modulator modules 220a, 220b in sequence, e.g., as a queue of data to be transmitted. Each FEC/modulator module 220a, 220b processes the code blocks in the sequence provided by the CRO 210. For each code block CB #1 to CB #5, the FEC/modulator modules 220a, 220b determine the corresponding MODCOD and apply the FEC parameters and modulation for that MODCOD, e.g., to ensure that CB #1 is processed with MODCOD 1 and CB #2 to CB #5 are processed with MODCOD 2. The outputs are then transmitted on the respective carriers through a satellite network.

Figure 4:
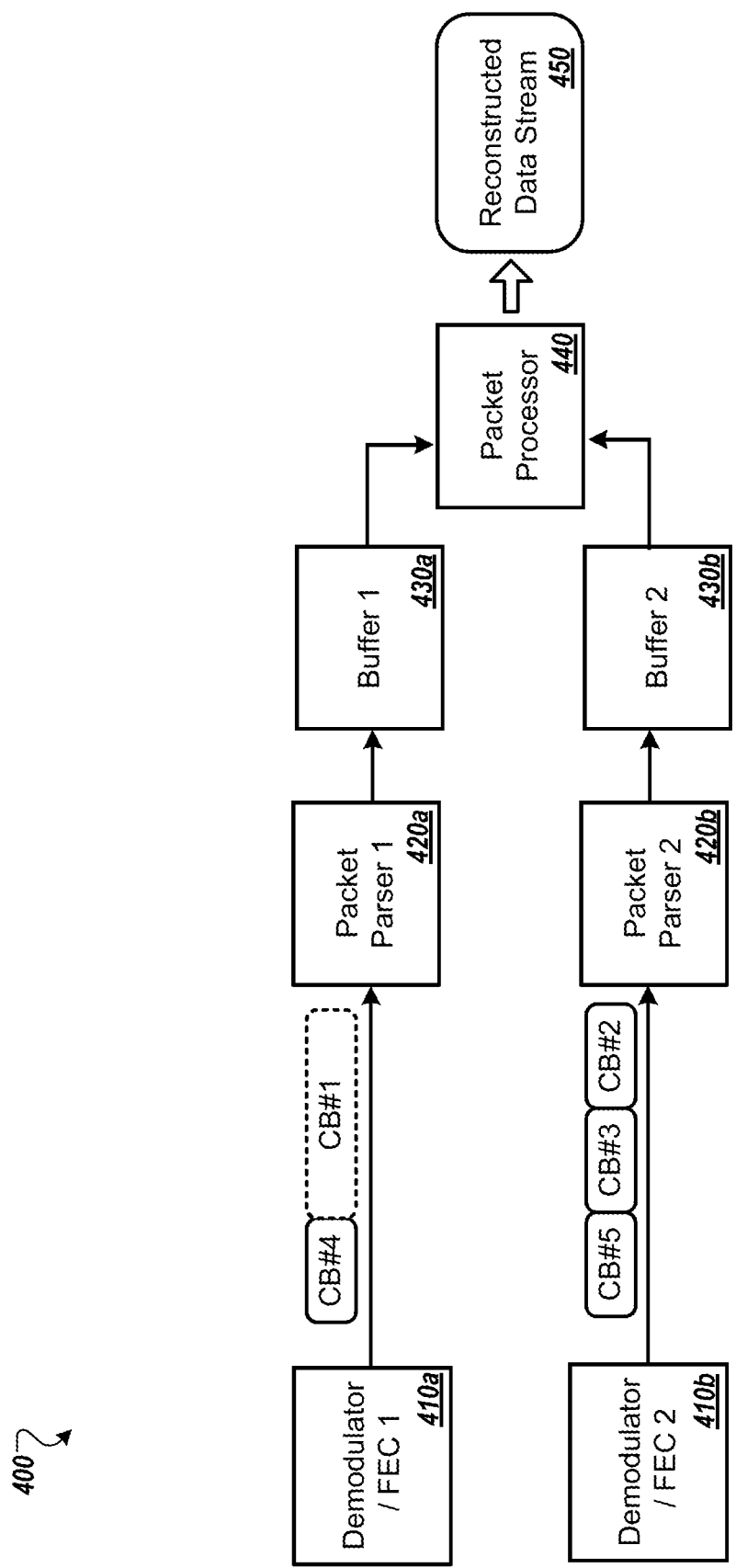
FIG. 4 is block diagram that illustrates an example of channel bonding operations at a receiver.

FIG. 4 is block diagram that illustrates an example of channel bonding operations at a receiver 400. After the data stream 230 is transmitted as discussed above, the receiver 400 receives the modulated signals over its satellite link. In particular, the receiver 400 includes multiple tuners to simultaneously receive data on each of the carriers used to send the data stream 230.

The receiver 400 includes two demodulator/FEC modules 410a, 410b, each of which processes signals received on a different carrier. The demodulator/FEC modules 410a, 410b process the code blocks from two carriers separately. As the received signals are demodulated and decoded, the modules 410a, 410b each pass the obtained code blocks to a corresponding packet parser 420a, 420b. Each demodulator/FEC block 410a, 410b outputs decoded code blocks as input to the corresponding packet parser block 420a, 420b, which parses or filters the GSE packets in the payload section of the code blocks and saves the packets in buffers 430a, 430b. The code blocks CB #1 to CB #5 have been previously labeled with the code block sequence number 314 and stream identifier 312 in the baseband header 310 of the code block 300. The code block sequence number 314 applies to all GSE packets in the code block 300, to provide sequence information for use by the packet processor 440 to reconstruct the PDUs in order.

The packet processor 440 processes the buffered packets from both buffers 430a, 430b according to the packet encapsulation protocol used, such as GSE, to reassemble the PDUs for the data stream 230 from the GSE packets 322a-322c of each code block. The packet processor 440 checks the packets in both buffers 430a, 430b and chooses the packets associated with a smaller code block sequence number 314 to process first. This will restore the order of the data as they received at the transmitter 200, allowing the packet processor 440 to generate a reconstructed data stream 450 of PDUs that matches the input data stream 230 to the transmitter 200.

In some implementations, the transmitter 200 transmits code blocks for a data stream so that the code blocks transmitted on each carrier are in sequence according to the code block sequence numbers 314. That is, on any given carrier, the transmitter 200 does not transmit an earlier code block in the sequence after a later-occurring code block in the sequence, even though some code blocks may be skipped and transmitted on another carrier. For example, in the example of FIGS. 2 and 4, the sequence numbers are increasing on both channels, e.g., CB #1 and then CB #4 for carrier 1, and CB #2, CB #3, and CB #5.

In addition, when a carrier does skip a code block in the sequence, the transmitter 200 may (i) provide the code block on another channel and (ii) constrain the delay before the skipped code block is provides, so that the receiver's buffers are not exceeded. For example, in the example of FIGS. 2 and 4, the transmission on carrier 2 provided code blocks CB #2, CB #3, and CB #5 and skipped CB #4. The transmitter 200 then provides the skipped code block on carrier 1 within a predetermined maximum delay. The example shown shows the CB #5 and CB #5 being transmitted simultaneously to ensure no break in the sequence. Other thresholds can be set, such as the code blocks arriving within microseconds, milliseconds, or other time frame of each other. In addition, or as an alternative, the transmitter 200 could limit transmission of further code blocks of the data stream on carrier 2 until the skipped packet CB #4 had been transmitted.

Figure 5:
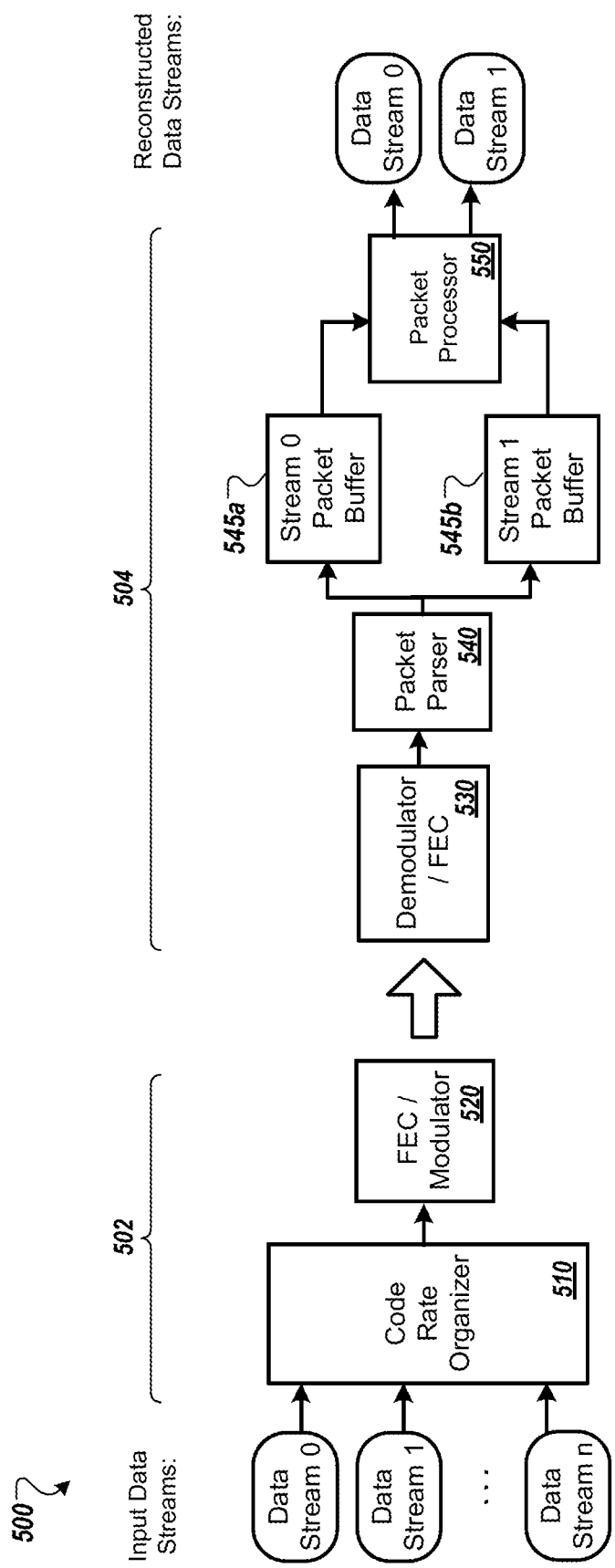
FIG. 5 is a block diagram illustrates an example of a system for multiplexing multiple data streams.

FIG. 5 is a block diagram illustrates an example of a system 500 for multiplexing multiple data streams. Using the techniques discussed above, the code blocks can include stream identifiers 312 that allow data from different data streams to be mixed in a network channel and separated. The channel bonding techniques can be applied together with the channel multiplexing method in the ACM mode.

Channel multiplexing involves two or more input data streams transmitted over a single carrier, as shown in FIG. 5. At a transmitter 502, data streams 0, 1, . . . n can all be organized into code blocks by the code rate organizer 510. The code blocks from each data stream are labeled with a stream identifier 312 in the baseband header 310. A different set of MODCOD queues can be used for each data stream. The multiplexing operation can occur alongside channel bonding that may split some data streams among multiple carriers. As shown in FIG. 5, an FEC/modulator module 520 prepares code blocks for transmission through a satellite communications system.

At a receiver 504, the modulated data is demodulated and decoded by a demodulator/FEC module 530, which passes the recovered code blocks to a packet parser 540. The packet parser 540 parses the GSE packets in the payload section of the code blocks and stores the packets in packet buffers 545a, 545b. A separate packet buffer can be allocated for each data stream 0, 1 . . . n that is relevant to the receiver 504. In some implementations, a user of a terminal may select one or more data streams to be received. In the example, the user has selected only data streams 0 and 1, and so the receiver determines that only those streams need to be received. The use of the packet parser 540 allows more flexible processing by separating appropriate data packets from streams of interest and saving them into separate corresponding buffers 545a, 545b. A packet processor 550 in the receiver 504 then receives data from the packet buffers 545a, 545b, and processes the data according to a predetermined priority scheme.

Figure 6:
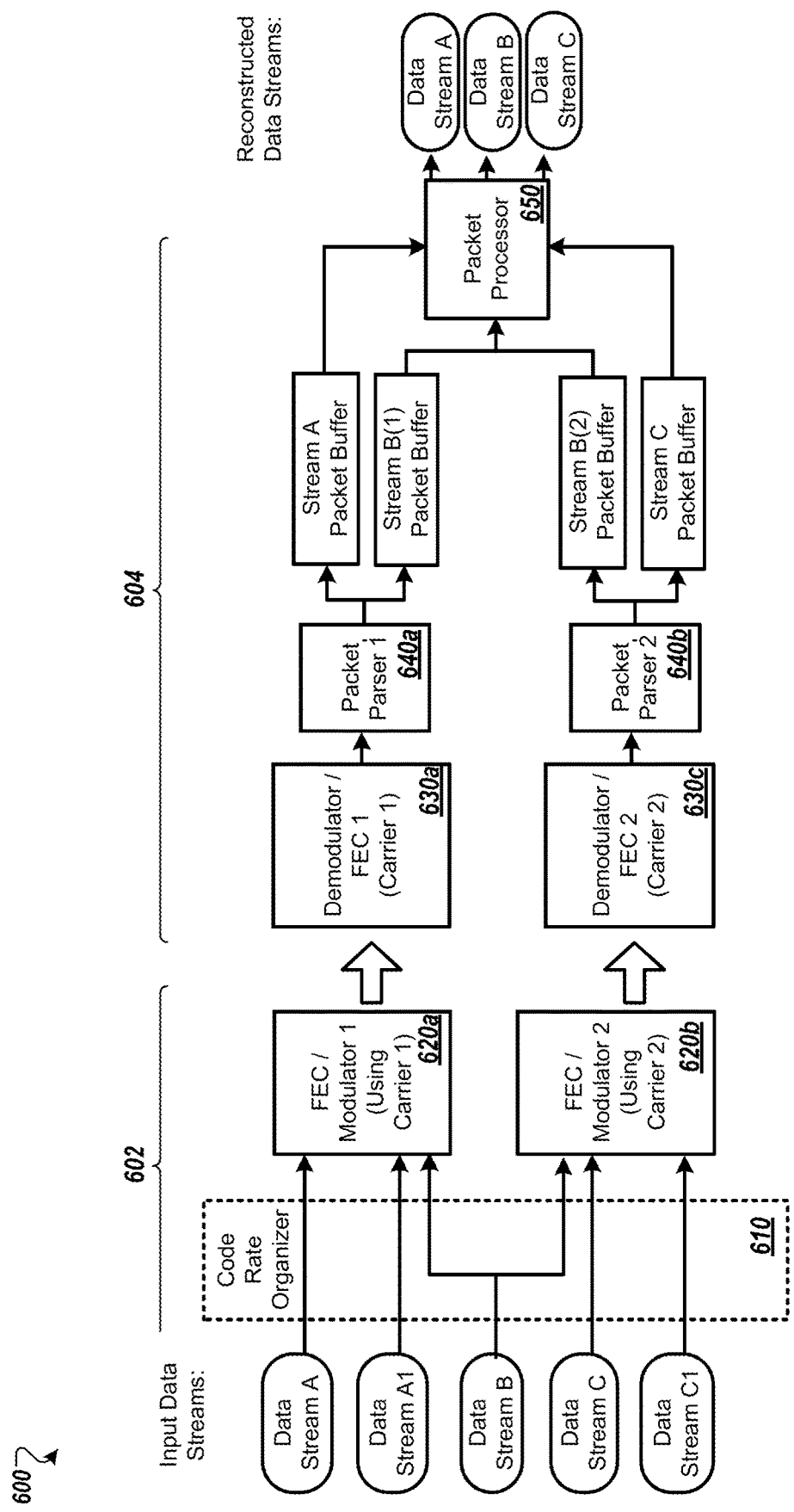
FIG. 6 is a block diagram that illustrates an example of a system for multiplexing data streams and performing channel bonding in an ACM mode.

FIG. 6 is a block diagram that illustrates an example of a system 600 for multiplexing data streams and performing channel bonding in an ACM mode. The system includes a transmitter 602 and a receiver 604. The example of FIG. 6 shows a mix of channel bonding and multiplexing.

At the transmitter 602, five input data streams are shown, A, A1, B, C, and C1. Data streams A and A1 are multiplexed onto carrier 1, and data streams C and C1 are multiplexed onto carrier 2. These streams do not use channel bonding in the illustrated example. Data stream B, however, is transmitted using channel bonding, with a portion being sent over carrier 1, and another portion sent over carrier 2. A code rate organizer (CRO) 610 as discussed above, can receive each of the data streams A, A1, B, C, and C1 and generate code blocks for each, as well as to coordinate the use of different MODCOD arrangements on each carrier and to distribute the code blocks of data stream B among the different carriers. This process interleaves code blocks of different data streams together on each carrier. The CRO 610 is shown in dashed lines simply to allow the distribution of the data from data streams A, A1, B, C, and C1 among different channels to be seen more clearly.

The CRO 610 may provide, to each FEC/modulator 620a, 620b, a single stream of code blocks that intersperses the data from among the various data streams. For example, a first stream of code blocks generated from data streams A, A1, and B can be provided to FEC/modulator 620a, and a second stream of code blocks generated from data streams B, C, and C1 can be concurrently provided to FEC/modulator 620b. The CRO 610 also provides, with the streams of code blocks, data indicating which MODCOD to use for transmission of the code blocks. By using ACM techniques, code blocks representing different input data streams may different MODCODs assigned, and the CRO 610 can indicate for each code block, or for groups of code blocks, which MODCOD should be applied by the FEC/modulators 620a, 620b. The FEC/modulator 620a, 620b process their respective code blocks and send them for transmission. This can involve each FEC/modulator 620a, 620b switching independently between the MODCOD being applied, in order for each FEC/modulator 620a, 620b to modulate each code block with the MODCOD assigned by the CRO 610.

The receiver 604, which processes both carriers, will sort packets from selected streams in each carrier into different packet buffers. In the example of FIG. 6, the receiver 604 determines that a user has selected only three of the five streams being transmitted, and identifies streams A, B, and C as the user-selected streams to be received. Streams A1 and C1 were not selected, and so are not reconstructed by the receiver 604. The receiver 604 includes a demodulator/FEC 630a, 630b for each carrier. Each demodulator/FEC 630a, 630b provides demodulated code blocks to a corresponding packet parser 640a, 640b, which extracts the GSE packets from the code blocks and stores the extracted packets for each data stream in a corresponding stream buffer. Each packet parser uses a separate packet buffer for each data stream of interest. As shown in FIG. 6, for data stream B that is sent over two channels, the packet parsers 640a, 640b each use a separate packet buffer to store the portions of data stream B received over their respective channels.

The packet data in the packet buffers is provided to the packet processor 650. The packet processor 650 processes packets from data stream A and data stream C, each from a single packet buffer. The packet processor 650 processes bonded stream B from two packet buffers (e.g., one populated from each packet parser 640a, 640b). Separation of these full and partial streams makes processing flexible and not subject latency due to each other.

The downstream packet processor 650 processes packets from regular stream A, bonded stream B, and regular stream C to recreate the original sequence of PDUs in the three data streams. For stream B, this involves combining the packets from the stream B(1) packet buffer and the packets from the stream B(2) packet buffer, and interleaving or reordering the packets as needed to recreate the original packet sequence.

Multiplexing multiple streams with a mix of bonded streams and non-bonded streams can help mitigate the latency associated with channel bonding. In FIG. 6, packet parsers 640a, 640b (similar to those in FIG. 5) save packets from different streams into different buffers. This makes processing packets in buffers for streams A and C (FIG. 7) not subject to the latency introduced because of the channel bond for stream B. Additional latency from channel bonding only applies to packets in buffers B(1) and B(2), the data stream that was transmitted over two channels.

In some geographical areas, wideband channels are used. Large-bandwidth channels may allow for high symbol rates or high data transfer rates, but may increase the likelihood that at least a portion of the channel will experience interference. For example, a satellite communications provider may need to operate around other incumbent operators or systems that use a portion of the wideband channel. To enable communication despite the interference, a channel may be split into multiple subchannels. For example, a 250 MHz channel may be split into four subchannels, and the subchannels without interference can be bonded together. For example, subchannels 1-4 are defined from the primary channel, and interference occurs for only subchannel 2, then subchannels 1, 3, and 4 can be bonded together to maximize throughput while avoiding interference.

To carry out this bonding of subchannels, the satellite gateway 110 can be instructed to not send to a particular receiver on subchannels experiencing interference. For example, when a receiver is installed, the receiver can perform a scan over the entire wideband channel to identify which frequencies or frequency ranges have unacceptable interference. The receiver can capture samples of received data for the channel and perform a fast Fourier transform on the data. From the frequency domain information, the receiver can determine the frequencies at which interference occurs within the wideband channel. From this information, receiver can determine which subchannels should be avoided due to interference, and which sub-channels can be used effectively. The receiver provides this information to the satellite gateway 110. In the example noted above, the receiver may indicate that subchannel 2 should be avoided, but subchannels 1, 3, and 4 can be used for communication.

The satellite gateway 110 uses the information from the receivers to select which subchannels to bond for transmissions to each receiver. For example, due to different interference characteristics, subchannels 1, 3, and 4 may be bonded for transmissions to one receiver, while subchannels 2 and 4 may be bonded for transmissions to another receiver. The receivers can periodically scan the wideband channel and determine which subchannels are currently available or unavailable due to interference. The receivers provide the results of these periodic scans to the satellite gateway 110, which allows the satellite gateway 110 to dynamically change which subchannels are bonded for each receiver. Similarly, as discussed above, the satellite gateway 110 can dynamically set the MODCOD used for each subchannel for each receiver according to the channel conditions reported by the receivers.

As discussed above, the detection of interference at receivers and the dynamic selection of which channels to bond for each receiver can be done for any appropriate type of channel, not only for sub-channels within a wideband channel. The same principles allow channels of all types to be selected and changed by the satellite gateway 110 according to the needs of receivers over time.

In some implementations, channel bonding can allow efficient use of multiple channels, especially where many narrowband channels are often used. For example, in a port where many ships may be communicating, a number of narrowband channels may typically be used to accommodate many streams of traffic. At the satellite gateway 110, when an increase in network traffic is detected in an area or over a particular channel, the satellite gateway 110 can dynamically initiate bonding of two or more channels to deal with temporary high demand. The bonding can be done for a particular beam area served by the satellite system, with different bonding being used for different geographical beam areas. The two bonded channels can act essentially as a single wideband channel for the satellite gateway 110 to maximize statistical multiplexing efficiency.

In some scenarios, different channels have been defined for different service types. For example, some systems define a relatively low-data-rate channel for some purposes, e.g., for voice data from mobile devices, for small antenna terminals, for sending data at low data rates, or to allow more overhead for lower signal-to-noise ratios. In these scenarios, a high-bandwidth channel is often also allocated, e.g., for Internet traffic. However, the separation of channels in this manner may lead to inefficient usage, especially if the low-data-rate channel intended to provide more robust service experiences low traffic and the bandwidth is underutilized. The techniques in the present application can avoid the need for splitting channels, since a MODCOD allowing for lower SNR can be used on any channel. Similarly, the present techniques can better use bandwidth even when separate channels are defined. With channel bonding and ACM, the satellite gateway 110 can allocate traffic that would normally be sent to from the high-data-rate channel to the low-data-rate channel, using a low-overhead MODCOD is appropriate. This can fill unused capacity on the low-data-rate channel when appropriate.

Figure 7:
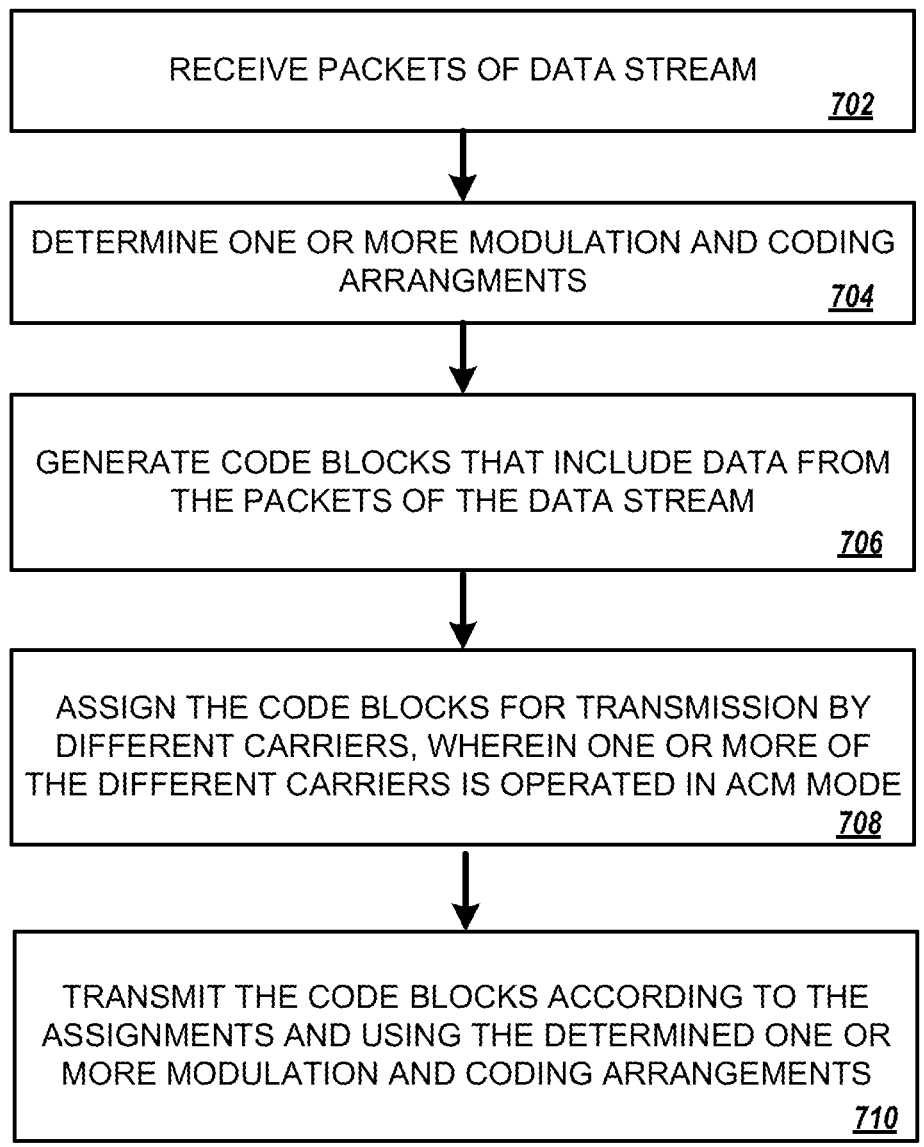
FIG. 7 is flow diagram that illustrates a process for channel bonding in an ACM mode.

FIG. 7 is flow diagram that illustrates a process 700 for channel bonding in an ACM mode. The process may be performed by a transmitter in a satellite communications system.

One or more modulation and coding arrangements are determined for the received packets (704). The determination can involve sorting the received packets of the data stream into multiple queues that each correspond to a different modulation and coding arrangement.

Code blocks that include data from the packets of the data stream are generated (706). In some implementations, each code block has a header that includes a sequence identifier indicating a position of the code block in a sequence of the code blocks. Each code block can be generated from packets having a same modulation and coding arrangement determined. Each code block may have a fixed data length. As a result, padding may be added to a payload to reach the fixed size. The payload of a code block may include one or more generic stream encapsulation elements. The code block may include a header that includes a stream identifier and a sequence number.

The code blocks are assigned for transmission on different carriers (708). One or more of the different carriers is operated in an adaptive coding and modulation mode to support multiple modulation and coding arrangements within a single carrier.

To assign the code blocks for different carriers, a transmitter can take into account differing data transmission rates of different modulation and coding arrangements. For example, a carrier in ACM mode may be used to carry data from multiple queues that each have a different data transmission rate. The transmitter can determining the data transmission rate for each of the multiple queues, e.g., for each of the different modulation and coding arrangements. The assignment of code blocks for transmission on the different carriers can be done based on the determined data transmission rates. For example, given the lower rate of some modulation and coding arrangements used on one of multiple bonded channels, a greater proportion of code blocks can be weighted for transmission on other channels to balance the transmission of a data stream. Similarly, the selection of which packets are assigned to each carrier can be adjusted so that code blocks on the channel with the lower data rate arrive in at the same time or within a threshold amount of time from nearby code blocks in the sequence.

Various techniques can be used to assign the code blocks for transmission on the different carriers. For example, the assignment can synchronize transmission of the code blocks in a sequence across the different carriers. The assignment can order the transmission of the code blocks to satisfy a timing constraint between transmission of one of the code blocks in the sequence and transmission of a subsequent code block in the sequence. The assignment can arrange the transmission so that at least some of the code blocks to be transmitted over a first carrier of the different carriers while a code block that is adjacent (e.g., immediately before or after) in the sequence is concurrently transmitted over a second carrier of the different carriers. As another example, the assignments can be made so that, for a given code block, not more than a predetermined maximum amount of data from the data stream is transmitted.

The code blocks in the satellite communications system are transmitted on the different carriers, according to the assignments (710). The transmissions are made using the determined one or more modulation and coding arrangements. For example, the transmission can involve broadcasting a digital video broadcasting data stream to a plurality of recipients using the satellite communications system.

In some implementations, each of the different carriers is operated in the adaptive coding and modulation mode. Assigning the code blocks for transmission on the different carriers can involve specifying, for each of the different carriers, a transmission sequence for the code blocks assigned to the carrier. Transmitting the generated code blocks can include transmitting, on each of the different carriers, code blocks assigned to the carrier in the transmission sequence specified for the code blocks assigned to the carrier.

In some implementations, one or more additional data streams are received. A sequence of code blocks can be generated for each of the one or more additional data streams. The code blocks corresponding to each data stream can include a respective stream identifier for their data streams. Transmissions of the code blocks of the one or more additional data streams on the different carriers can be interleaved with transmissions of the code blocks for the one or more additional data streams.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A system comprising:
   one or more processors; and
   one or more data storage devices storing instructions that, when executed by the one or more processors, cause the system to perform operations comprising:
      receiving multiple data streams for transmission in a satellite communications system, the multiple data streams comprising a first data stream and a second data stream;
      generating code blocks comprising (i) a set of first code blocks that include data from packets of the first data stream and (ii) a set of second code blocks that include data from packets of the second data stream;
      assigning code blocks to channels for transmission, including assigning the set of first code blocks to be split among first channels for transmission and assigning the set of second code blocks to be split among second channels for transmission, wherein a particular channel is included in both the first channels and the second channels, and wherein the particular channel is used in an adaptive coding and modulation mode to support multiple modulation and/or coding arrangements within a single channel; and
      transmitting the first code blocks and the second code blocks on the assigned channels using the satellite communication system, the transmission being performed such that a subset of the first code blocks is transmitted on the particular channel and a subset of the second code blocks is transmitted on the particular channel, wherein the subset of the first code blocks is transmitted on the particular channel using a first modulation and/or coding arrangement, wherein the subset of the second code blocks is transmitted on the particular channel using a second modulation and/or coding arrangement, and wherein the first modulation and/or coding arrangement is different from the second modulation and/or coding arrangement.

2. The system of claim 1, wherein the first modulation and/or coding arrangement is selected based on an indication of a physical channel condition for a first terminal designated to receive the first data stream, and wherein the second modulation and/or coding arrangement is selected based on an indication of a physical channel condition for a second terminal designated to receive the second data stream.

3. The system of claim 1, wherein, for at least the particular channel used in an adaptive coding and modulation mode, one or more code blocks of the subset of first data stream are transmitted on the particular channel interleaved with one or more code blocks of the subset of the second data stream.

4. The system of claim 1, wherein the first modulation and/or coding arrangement is selected for at least a portion of the first data stream and the second modulation and/or coding arrangement is selected for at least a portion of the second data stream, and wherein the first code blocks are generated based at least in part on the first modulation and/or coding arrangement, and wherein the second code blocks are generated based at least in part on the second modulation and/or coding arrangement.

5. The system of claim 1, wherein the first data stream comprises a first sequence of packets, and wherein the second data stream comprises a second sequence of packets; and
   wherein each of the code blocks in the first set of code blocks includes multiple packets from the first sequence of packets, and wherein each of the code blocks in the second set of code blocks includes multiple packets from the second sequence of packets.

6. The system of claim 1, wherein the first code blocks and the second code blocks are generated so that each code block has the same data length.

7. The system of claim 1, wherein each of the first channels has a different code block transmission duration for transmitting a code block, and wherein the first code blocks are distributed among the first channels based on the respective code block transmission durations for the first channels.

8. The system of claim 1, wherein assigning the first set of code blocks comprises the assigning the first code blocks to the first channels proportionally to data transmission rates achieved on the respective first channels.

9. The system of claim 1, wherein transmitting the first code blocks and the second code blocks on the assigned channels comprises limiting a delay with which the first code blocks arrive out of sequence at a receiver by inserting transmissions of second code blocks on the particular channel among transmissions of the first code blocks on the particular channel.

10. The system of claim 1, wherein the first data stream comprises packets of a digital video broadcasting data stream to be broadcast; and wherein transmitting the first code blocks comprises broadcasting the digital video broadcasting data stream to a plurality of recipients using the satellite communications system.

11. The system of claim 1, wherein assigning the first code blocks for transmission on the first channels comprises assigning the first code blocks for transmission such that at least some of the first code blocks are transmitted out of order but satisfying a predetermined timing constraint that limits a maximum difference with respect to a proper sequence of transmission of the code blocks.

12. The system of claim 1, wherein the operations comprise, before distributing data from packets for transmission on the different channels, sorting the packets into multiple queues that each correspond to a different modulation and/or coding arrangement; and wherein generating the code blocks comprises:
extracting, from one of the queues, multiple packets in the same queue for a particular modulation and/or coding arrangement; and
generating one or more code blocks from the multiple packets, with the one or more code blocks being assigned for transmission using the particular modulation and coding arrangement for the queue from which the multiple packets were extracted.

13. The system of claim 12, wherein each of the multiple queues has a different data transmission rate according to the different modulation and coding arrangements;

wherein the operations further comprise determining the data transmission rate for each of the multiple queues; and wherein assigning the code blocks to channels for transmission comprises assigning the generated code blocks to the different channels based on the determined data transmission rates.

14. A method comprising:
receiving multiple data streams for transmission in a satellite communications system, the multiple data streams comprising a first data stream and a second data stream;
generating code blocks comprising (i) a set of first code blocks that include data from packets of the first data stream and (ii) a set of second code blocks that include data from packets of the second data stream;
assigning code blocks to channels for transmission, including assigning the set of first code blocks to be split among first channels for transmission and assigning the set of second code blocks to be split among second channels for transmission, wherein a particular channel is included in both the first channels and the second channels, and wherein the particular channel is used in an adaptive coding and modulation mode to support multiple modulation and/or coding arrangements within a single channel; and
transmitting the first code blocks and the second code blocks on the assigned channels using the satellite communication system, the transmission being performed such that a subset of the first code blocks is transmitted on the particular channel and a subset of the second code blocks is transmitted on the particular channel, wherein the subset of the first code blocks is transmitted on the particular channel using a first modulation and/or coding arrangement, wherein the subset of the second code blocks is transmitted on the particular channel using a second modulation and/or coding arrangement, and wherein the first modulation and/or coding arrangement is different from the second modulation and/or coding arrangement.

15. The method of claim 14, wherein the first modulation and/or coding arrangement is selected based on an indication of a physical channel condition for a first terminal designated to receive the first data stream, and wherein the second modulation and/or coding arrangement is selected based on an indication of a physical channel condition for a second terminal designated to receive the second data stream.

16. The method of claim 14, wherein, for at least the particular channel used in an adaptive coding and modulation mode, one or more code blocks of the subset of first data stream are transmitted on the particular channel interleaved with one or more code blocks of the subset of the second data stream.

17. The method of claim 14, wherein the first modulation and/or coding arrangement is selected for at least a portion of the first data stream and the second modulation and/or coding arrangement is selected for at least a portion of the second data stream, and wherein the first code blocks are generated based at least in part on the first modulation and/or coding arrangement, and wherein the second code blocks are generated based at least in part on the second modulation and/or coding arrangement.

18. The method of claim 14, wherein the first data stream comprises a first sequence of packets, and wherein the second data stream comprises a second sequence of packets; and wherein each of the code blocks in the first set of code blocks includes multiple packets from the first sequence of packets, and wherein each of the code blocks in the second set of code blocks includes multiple packets from the second sequence of packets.

19. The method of claim 14, wherein the first code blocks and the second code blocks are generated so that each code block has the same data length.

20. One or more non-transitory machine-readable media storing instructions that are operable, when executed by one or more processors, to cause a communication system to perform operations comprising:
receiving multiple data streams for transmission in a satellite communications system, the multiple data streams comprising a first data stream and a second data stream;
generating code blocks comprising (i) a set of first code blocks that include data from packets of the first data stream and (ii) a set of second code blocks that include data from packets of the second data stream;
assigning code blocks to channels for transmission, including assigning the set of first code blocks to be split among first channels for transmission and assigning the set of second code blocks to be split among second channels for transmission, wherein a particular channel is included in both the first channels and the second channels, and wherein the particular channel is used in an adaptive coding and modulation mode to support multiple modulation and/or coding arrangements within a single channel; and
transmitting the first code blocks and the second code blocks on the assigned channels using the satellite communication system, the transmission being performed such that a subset of the first code blocks is transmitted on the particular channel and a subset of the second code blocks is transmitted on the particular channel, wherein the subset of the first code blocks is transmitted on the particular channel using a first modulation and/or coding arrangement, wherein the subset of the second code blocks is transmitted on the particular channel using a second modulation and/or coding arrangement, and wherein the first modulation and/or coding arrangement is different from the second modulation and/or coding arrangement.

* * * * *